United States Patent [19]
Yonezawa

[11] Patent Number: 5,974,247
[45] Date of Patent: Oct. 26, 1999

[54] APPARATUS AND METHOD OF LSI TIMING DEGRADATION SIMULATION

[75] Inventor: Hirokazu Yonezawa, Hyogo, Japan

[73] Assignee: Matsushita Electronics Corporation, Osaka, Japan

[21] Appl. No.: 08/918,102

[22] Filed: Aug. 27, 1997

[30] Foreign Application Priority Data

Aug. 29, 1996 [JP] Japan ..................................... 8-228118

[51] Int. Cl.⁶ .................................................. G06F 9/455
[52] U.S. Cl. ................................ 395/500.4; 395/500.41; 395/500.07
[58] Field of Search ............................ 364/578; 324/769, 324/768, 765; 395/185.08, 183.16, 183.09, 500.41, 500.4, 500.07

[56] References Cited

U.S. PATENT DOCUMENTS

| | | | |
|---|---|---|---|
| 5,508,632 | 4/1996 | Shimizu | 324/769 |
| 5,533,197 | 7/1996 | Moran et al. | 395/185.08 |
| 5,600,578 | 2/1997 | Fang et al. | 364/578 |
| 5,634,001 | 5/1997 | Mittl et al. | 395/183.09 |

FOREIGN PATENT DOCUMENTS 08031893  2/1996  Japan .

OTHER PUBLICATIONS

T. Goodman et al., "High Speed Electrical Characterization and Simulation of a Pin Grid Array Package ", IEEE Transactions on Components, Packaging, and Manufacturing Technology–Part B, vol. 18, No. 1, Feb. 1995, pp. 163–167.

H. Yonezawa et al., "Ratio Based Hot–Carrier Degradation Modeling for Aged Timing Simulation of Millions of Transistors Digital Circuits", IEDM '98 Technical Digest., International Electron Devices Meeting, 1998, pp. 93–96.

R.H. Tu, et al., "Berkeley Reliability Tools–BERT", IEEE Transactions on Computer–Aided Design of Integrated Circuits and Systems, vol. 12, No. 10, Oct. 1993, pp. 1524–1534.

Cadence Design Systems, "Cadence Standard Parasitic format (SPF)", Cadence Standard Parasitic Format (SPF) Specification, Version C1.3, Sep. 16, 1993, pp. 8–20.

Open Verilog International, "Standard Delay Format Specification", Standard Delay Format Specification, Version 3.0, May 1995, pp. 3–23.

*Primary Examiner*—Kevin J. Teska
*Assistant Examiner*—Russell W. Fredjd
*Attorney, Agent, or Firm*—McDermott, Will & Emery

[57] ABSTRACT

An apparatus and method of simulating the operation of an LSI after degradation is provided for predicting actual LSI degradation with time at the design stage, so as to prevent the LSI specification from becoming excessively reliable. A reliability library generation device drives a circuit reliability simulator and generates a reliability library which shows the dependence of the property degradation degree of each circuit cell on predetermined operational conditions. A cell delay degradation estimation means estimates the delay degradation degree with time of each circuit cell which composes a target LSI, by referring to the reliability library. An LSI timing degradation estimation means estimates the delay of each circuit cell in the target LSI which has been degraded with time, based on the delay degradation degree of each circuit cell, and generates an after-degradation LSI timing. A logic simulator simulates the operation of an LSI after degradation, based on the after-degradation LSI timing, so that the timing degradation of each signal path in the target LSI can be accurately expressed in conformation to real operation.

17 Claims, 18 Drawing Sheets

Fig. 4

| NUMBER OF INPUT SIGNAL SWITCHING (NUMBERS) | INPUT SIGNAL RISE TIME (nS) | OUTPUT LOAD CAPACITANCE (fF) | DELAY DEGRADATION AMOUNT (nS) |
|---|---|---|---|
| $10^{13}$ | 0.1 | 10<br>100<br>1000<br>10000 | 0.01<br>0.05<br>0.1<br>0.2 |
| | 1.0 | 10<br>100<br>1000<br>10000 | 0.04<br>0.1<br>0.2<br>0.4 |
| | 10.0 | 10<br>100<br>1000<br>10000 | 0.07<br>0.15<br>0.4<br>0.7 |
| $10^{14}$ | 0.1 | 10<br>100<br>1000<br>10000 | 0.02<br>0.07<br>0.15<br>0.3 |
| | 1.0 | 10<br>100<br>1000<br>10000 | 0.05<br>0.15<br>0.3<br>0.6 |
| | 10.0 | 10<br>100<br>1000<br>10000 | 0.1<br>0.2<br>0.5<br>1.0 |
| ⋮ | ⋮ | ⋮ | ⋮ |

Fig. 9

| NUMBER OF INPUT SIGNAL SWITCHING (NUMBERS) | INPUT SIGNAL RISE TIME (nS) | OUTPUT LOAD CAPACITANCE (fF) | OUTPUT SIGNAL FALL TIME DEGRADATION AMOUNT (nS) |
|---|---|---|---|
| $10^{13}$ | 0.1 | 10<br>100<br>1000<br>10000 | 0.01<br>0.052<br>0.1<br>0.2 |
| | 1.0 | 10<br>100<br>1000<br>10000 | 0.04<br>0.1<br>0.22<br>0.4 |
| | 10.0 | 10<br>100<br>1000<br>10000 | 0.07<br>0.15<br>0.41<br>0.7 |
| $10^{14}$ | 0.1 | 10<br>100<br>1000<br>10000 | 0.02<br>0.07<br>0.15<br>0.3 |
| | 1.0 | 10<br>100<br>1000<br>10000 | 0.05<br>0.15<br>0.35<br>0.6 |
| | 10.0 | 10<br>100<br>1000<br>10000 | 0.1<br>0.23<br>0.56<br>1.0 |
| ⋮ | ⋮ | ⋮ | ⋮ |

Fig. 10

| NUMBER OF INPUT SIGNAL SWITCHING (NUMBERS) | INPUT SIGNAL RISE TIME (nS) | OUTPUT LOAD CAPACITANCE (fF) | DELAY DEGRADATION RATIO |
|---|---|---|---|
| $10^{13}$ | 0.1 | 10<br>100<br>1000<br>10000 | 1.01<br>1.02<br>1.03<br>1.05 |
| | 1.0 | 10<br>100<br>1000<br>10000 | 1.02<br>1.03<br>1.05<br>1.07 |
| | 10.0 | 10<br>100<br>1000<br>10000 | 1.03<br>1.04<br>0.06<br>1.09 |
| $10^{14}$ | 0.1 | 10<br>100<br>1000<br>10000 | 1.02<br>1.03<br>1.05<br>1.08 |
| | 1.0 | 10<br>100<br>1000<br>10000 | 1.03<br>1.05<br>1.07<br>1.10 |
| | 10.0 | 10<br>100<br>1000<br>10000 | 1.05<br>1.07<br>1.10<br>1.12 |
| ⋮ | ⋮ | ⋮ | ⋮ |

Fig. 12

| SUPPLY VOLTAGE (V) | NUMBER OF INPUT SIGNAL SWITCHING (NUMBERS) | INPUT SIGNAL RISE TIME (nS) | OUTPUT LOAD CAPACITANCE (fF) | DELAY DEGRADATION AMOUNT (nS) |
|---|---|---|---|---|
| 3.3 | $10^{13}$ | 0.1 | 10<br>100<br>1000<br>10000 | 0.01<br>0.05<br>0.1<br>0.2 |
| | | 1.0 | 10<br>100<br>1000<br>10000 | 0.04<br>0.1<br>0.2<br>0.4 |
| | | 10.0 | 10<br>100<br>1000<br>10000 | 0.07<br>0.15<br>0.4<br>0.7 |
| | $10^{14}$ | 0.1 | 10<br>100<br>1000<br>10000 | 0.02<br>0.07<br>0.15<br>0.3 |
| | | 1.0 | 10<br>100<br>1000<br>10000 | 0.05<br>0.15<br>0.3<br>0.6 |
| | | 10.0 | 10<br>100<br>1000<br>10000 | 0.1<br>0.2<br>0.5<br>1.0 |
| | ⋮ | ⋮ | ⋮ | ⋮ |
| 3.6 | $10^{13}$ | 0.1 | 10<br>100<br>1000<br>10000 | 0.02<br>0.07<br>0.15<br>0.32 |
| | | 1.0 | 10<br>100<br>1000<br>10000 | 0.05<br>0.17<br>0.3<br>0.65 |
| | | 10.0 | 10<br>100<br>1000<br>10000 | 0.1<br>0.21<br>0.5<br>1.03 |
| | | 0.1 | 10<br>100<br>1000<br>10000 | 0.04<br>0.10<br>0.22<br>1.42 |
| | ⋮ | ⋮ | ⋮ | ⋮ |

Fig. 13

| TEMPERATURE (°C) | NUMBER OF INPUT SIGNAL SWITCHING (NUMBERS) | INPUT SIGNAL RISE TIME (nS) | OUTPUT LOAD CAPACITANCE (fF) | DELAY DEGRADATION AMOUNT (nS) |
|---|---|---|---|---|
| 27 | $10^{13}$ | 0.1 | 10<br>100<br>1000<br>10000 | 0.01<br>0.05<br>0.1<br>0.2 |
| | | 1.0 | 10<br>100<br>1000<br>10000 | 0.04<br>0.1<br>0.2<br>0.4 |
| | | 10.0 | 10<br>100<br>1000<br>10000 | 0.07<br>0.15<br>0.4<br>0.7 |
| | $10^{14}$ | 0.1 | 10<br>100<br>1000<br>10000 | 0.02<br>0.07<br>0.15<br>0.3 |
| | | 1.0 | 10<br>100<br>1000<br>10000 | 0.05<br>0.15<br>0.3<br>0.6 |
| | | 10.0 | 10<br>100<br>1000<br>10000 | 0.1<br>0.2<br>0.5<br>1.0 |
| | ⋮ | ⋮ | ⋮ | ⋮ |
| -20 | $10^{13}$ | 0.1 | 10<br>100<br>1000<br>10000 | 0.02<br>0.07<br>0.15<br>0.32 |
| | | 1.0 | 10<br>100<br>1000<br>10000 | 0.05<br>0.17<br>0.3<br>0.65 |
| | | 10.0 | 10<br>100<br>1000<br>10000 | 0.1<br>0.21<br>0.5<br>1.03 |
| | | 0.1 | 10<br>100<br>1000<br>10000 | 0.04<br>0.10<br>0.22<br>1.42 |
| | ⋮ | ⋮ | ⋮ | ⋮ |

| | NUMBER OF INPUT SIGNAL A SWITCHING (NUMBERS) | | |
|---|---|---|---|
| | $10^{13}$ | $10^{14}$ | $10^{15}$ |
| NUMBER OF INPUT SIGNAL B SWITCHING (NUMBERS) $10^{13}$ | table1(Tis,Cl) | table2(Tis,Cl) | table3(Tis,Cl) |
| $10^{14}$ | table4(Tis,Cl) | table5(Tis,Cl) | table6(Tis,Cl) |
| $10^{15}$ | table7(Tis,Cl) | table8(Tis,Cl) | table9(Tis,Cl) |

Fig. 19

| Tisck(nS) | Tisd(nS) | SETUP TIME(nS) |
|---|---|---|
| 0.1 | 0.1<br>1.0<br>10.0 | 0.9<br>1.5<br>3.0 |
| 1.0 | 0.1<br>1.0<br>10.0 | 0.6<br>1.0<br>2.5 |
| 10.0 | 0.1<br>1.0<br>10.0 | 0.4<br>0.8<br>2.0 |

Fig. 20

| | | NUMBER OF CLOCK SIGNAL SWITCHING (NUMBERS) | | |
|---|---|---|---|---|
| | | $10^{13}$ | $10^{14}$ | $10^{15}$ |
| NUMBER OF INPUT DATA SIGNAL SWITCHING (NUMBERS) | $10^{13}$ | table1<br>(Tisck, Tisd) | table2<br>(Tisck, Tisd) | table3<br>(Tisck, Tisd) |
| | $10^{14}$ | table4<br>(Tisck, Tisd) | table5<br>(Tisck, Tisd) | table6<br>(Tisck, Tisd) |
| | $10^{15}$ | table7<br>(Tisck, Tisd) | table8<br>(Tisck, Tisd) | table9<br>(Tisck, Tisd) |

Fig. 21(a)

| Tisck(nS) | Tisd(nS) | DEGRADATION AMOUNT OF SETUP TIME(nS) |
|---|---|---|
| 0.1 | 0.1<br>1.0<br>10.0 | 0.2<br>0.3<br>0.4 |
| 1.0 | 0.1<br>1.0<br>10.0 | 0.5<br>0.6<br>0.7 |
| 10.0 | 0.1<br>1.0<br>10.0 | 0.8<br>0.9<br>1.0 |

Fig. 21(b)

| Tisck(nS) | Tisd(nS) | DEGRADATION AMOUNT OF SETUP TIME(nS) |
|---|---|---|
| 0.1 | 0.1<br>1.0<br>10.0 | 0.7<br>0.8<br>0.9 |
| 1.0 | 0.1<br>1.0<br>10.0 | 1.0<br>1.1<br>1.2 |
| 10.0 | 0.1<br>1.0<br>10.0 | 1.3<br>1.4<br>1.5 |

APPARATUS AND METHOD OF LSI TIMING DEGRADATION SIMULATION

BACKGROUND OF THE INVENTION

The present invention relates to a technique of predicting LSI property degradation with time which results from a hot carrier phenomenon or the like, and of reflecting the prediction in LSI timing simulation.

A semiconductor integrated circuit (hereinafter referred to as LSI) has a certain life and suffers from failures or poor operation after a certain time period of operation. The main causes of such failures and poor operation include property degradation due to a hot carrier phenomenon or the breaking of a wire due to electro-migration. Of these causes, the hot carrier phenomenon degrades the driving capability of a transistor, which causes the LSI operational timing to change with time, leading to a wrong operation.

The recent development of manufacturing technique has accelerated the micro-miniaturization of LSI devices, so that a strong electric field which is generated in the LSI devices promotes the evolution of a hot carrier, or a high energy electron. Consequently, it is becoming harder to secure the LSI reliability against the hot carrier phenomenon.

In order to secure the LSI reliability, it is possible to provide an appropriate margin to the operational timing of every circuit uniformly so that sufficient allowance is made for changes in the operational timing with time, thereby securing the operation for a certain period of time. However, in this method, the margin is set in preparation for the worst case, which tends to make an LSI specification excessively reliable. Since the reliability and performance of an LSI are in the relation of the trade-off, the provision of excessive reliability leads to a decrease in the performance. Thus, it has been difficult to accomplish a high-performing LSI by this method.

In order to solve this problem, the following method has been used. The values of predetermined operational conditions at the operation of an LSI are examined for each circuit cell which is a circuit unit for composing the LSI, and it is verified whether the values of the operational conditions for each circuit cell fall in the range of satisfying the predetermined target values of the degradation amount or life of the LSI. Here, the circuit cell refers to an inverter which belongs to a standard cell library and which is used in an integrated circuit intended for a special purpose (ASIC) or the like. A circuit cell whose degradation amount and life do not satisfy the target values is regarded as a problematic circuit cell with regard to LSI reliability, and such a measure as design modification is taken.

However, this conventional method verifies only the degradation amount and life for each circuit cell composing an LSI, which tends to make the LSI specification excessively reliable. This point will be detailed as follows.

An LSI usually operates in accordance with a predetermined operational frequency. In other words, the predetermined time period determined by the predetermined operational frequency becomes a unit for process time in an LSI. On the other hand, signals in an LSI run through a signal path which is composed of several circuit cells within the predetermined time period. If a signal propagation delay in the signal path is so extended by degradation as to exceed the predetermined time period, then the LSI operational timing becomes out of order, leading to a wrong operation. Conversely, the LSI operational timing is maintained in order without causing a wrong operation as long as the extension of the signal propagation delay in a signal path due to degradation does not exceed the predetermined time period.

Suppose that there are signal paths A and B, and the signal path A has a signal propagation delay which is approximately equal to the predetermined time period (that is, susceptible to delay degradation), whereas the signal path B has a signal propagation delay much smaller than the predetermined time period (that is, resistant to delay degradation). In addition, suppose that both the signal paths A and B include circuit cells which have the common operational condition values, and that the values do not fall in the range of satisfying the target values of the degradation amount and life.

Under these conditions, according to the conventional method, the circuit cells included in the signal paths A and B are regarded as problematic circuit cells with regard to LSI reliability, and become the objects of design modification or the like. However, in actuality, the circuit cells included in the signal path A which is susceptible to delay degradation should be regarded as problematic, but the circuit cells included in the signal path B which is resistant to delay degradation should be judged not problematic with regard to the LSI reliability.

Thus, whether a circuit cell becomes problematic or not with regard to LSI reliability differs one circuit cell from another even under the same operational conditions. This is because the range of the degradation amount and life permitted to each circuit cell differ depending on the positions of the circuit cells in the LSI signal flow.

SUMMARY OF THE INVENTION

The present invention is to predict actual LSI degradation with time at the design stage, so as to prevent the LSI specification from becoming excessively reliable, thereby simulating the operation of the LSI after the LSI has been degraded.

To be more specific, the present invention is an LSI timing degradation simulation apparatus which predicts LSI degradation with time at a design stage and simulates the operation of an LSI after degradation, comprising: a cell delay degradation estimation means for estimating a delay degradation degree with time of each circuit cell which composes a target LSI, by referring to a reliability library which shows the dependence of a property degradation degree of a circuit cell on predetermined operational conditions, based on the values of the predetermined operational conditions at the operation of the target LSI; and an LSI timing degradation estimation means for estimating a delay of each circuit cell in the target LSI which has been degraded with time, based on the delay degradation degree of each circuit cell in the target LSI, estimated by the cell delay degradation estimation means. The operation of the target LSI after degradation is simulated based on the delay of each circuit cell in the degraded target LSI, estimated by the LSI timing degradation estimation means.

According to the LSI timing degradation simulation apparatus in accordance with the present invention, the cell delay degradation estimation means estimates the delay degradation degree of each circuit cell which composes a target LSI. At this moment, the cell delay degradation estimation means carries out the estimation by referring to the reliability library which shows the dependence of the property degradation degree of a circuit cell on predetermined operational conditions, based on the values of the predetermined operational conditions of the circuit cell at the operation of the target LSI. Consequently, the delay degradation degree of each circuit cell which reflects the actual operation of the target LSI can be obtained. Based on the delay degradation degree of each circuit cell, the LSI timing degradation estimation means estimates the delay of each circuit cell in the target LSI which has been degraded with time. Then the operation of the degraded LSI is simulated based on the delay of each circuit cell in the degraded LSI. Through the simulation, the timing degradation of each signal path in an LSI is expressed accurately in conformation to reality. Consequently, it can be avoided to design an excessively reliable LSI specification which results from the unpredictability of LSI degradation with time, and as a result, it becomes possible to design an LSI which has proper reliability and performance.

In addition, the LSI timing degradation simulation apparatus in accordance with the present invention preferably comprises a reliability library generation device for generating the above-mentioned reliability library by determining the property degradation degree of each transistor which composes each circuit cell through a circuit reliability simulator, and by determining the dependence of the property degradation degree of each circuit cell on the predetermined operational conditions, from the determined property degradation degree of each transistor.

BRIEF DESCRIPTION OF THE DRAWINGS

FIG. 4 is an example of information held in the reliability library according to the first embodiment of the present invention.

FIG. 9 is an example of information held in the reliability library according to the fourth embodiment of the present invention.

FIG. 10 is an example of information held in the reliability library according to the fifth embodiment of the present invention.

FIG. 12 is an example of information held in the reliability library according to the sixth embodiment of the present invention.

FIG. 13 is an example of information held in the reliability library according to the sixth embodiment of the present invention.

FIG. 19 is an example of information on the timing constraints held in the delay library in accordance with the ninth embodiment of the present invention, and the information shows the dependence of the setup time of a flip-flop before degradation on the operational conditions.

FIG. 20 is an example of information on the timing constraints held in the reliability library in accordance with the ninth embodiment of the present invention, and the information shows the dependence of the degradation amount of the setup time of a flip-flop on the operational conditions.

FIG. 21 is an example of information on the timing constraints held in the reliability library in accordance with the ninth embodiment of the present invention, and (a) is an example of table 1 shown in FIG. 20, and (b) is an example of table 2 shown in FIG. 20.

DETAILED DESCRIPTION OF THE INVENTION

The embodiments of the present invention will be described as follows with reference to the drawings.

(Embodiment 1)

Figure 1:
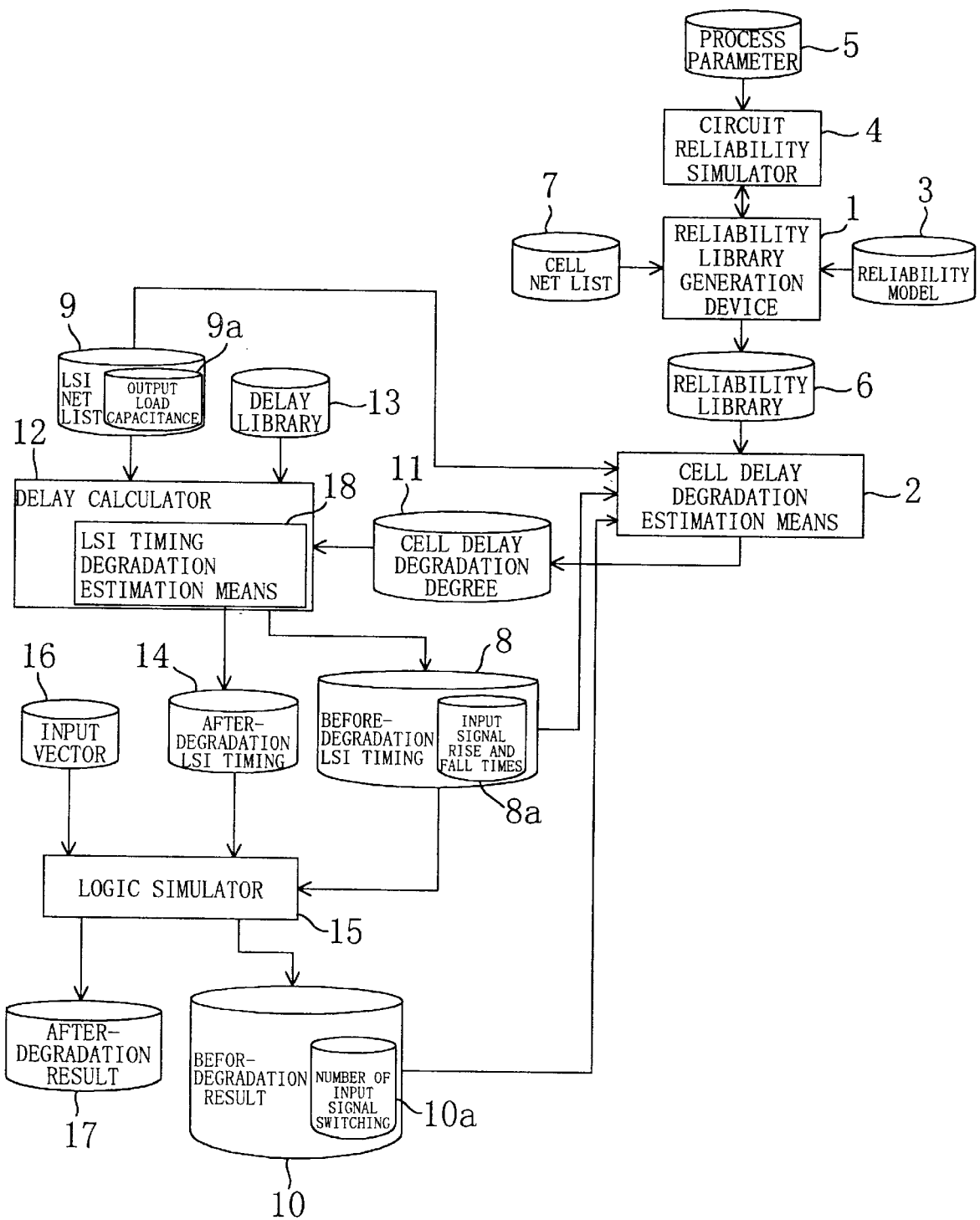
FIG. 1 is a block diagram showing the construction of the LSI timing degradation simulation apparatus in accordance with the first embodiment of the present invention.

FIG. 1 is a block diagram showing the construction of the LSI timing degradation simulation apparatus in accordance with the first embodiment of the present invention. As shown in FIG. 1, the LSI timing degradation simulation apparatus according to the present embodiment comprises a reliability library generation device 1 for driving a circuit reliability simulator 4 and generating a reliability library 6 which shows the dependence of the property degradation degree of each circuit cell on predetermined operational conditions, a cell delay degradation estimation means 2 for estimating the delay degradation degree with time of each circuit cell (cell delay degradation degree 11) which composes a target LSI, by referring to the reliability library 6, a delay calculator 12 for calculating the delay of each circuit cell in the target LSI, and a logic simulator 15 for simulating LSI operation, based on the LSI timing which includes the delay of each circuit cell. The delay calculator 12 includes an LSI timing degradation estimation means 18 for estimating the delay of each circuit cell in an LSI which has been degraded with time. The logic simulator 15 generates a before-degradation result 10 by simulating the operation of the LSI before degradation, based on the before-degradation LSI timing 8 which includes the delay of each circuit cell in the LSI which has not been degraded, and also generates an after-degradation result 17 by simulating the operation of the LSI after degradation, based on the after-degradation LSI timing 14 which includes the delay of each circuit cell in the LSI which has been degraded.

The following is a description of the operation of the LSI timing degradation simulation apparatus according to the present embodiment shown in FIG. 1.

(Reliability Library Generation Process)

Figure 2:
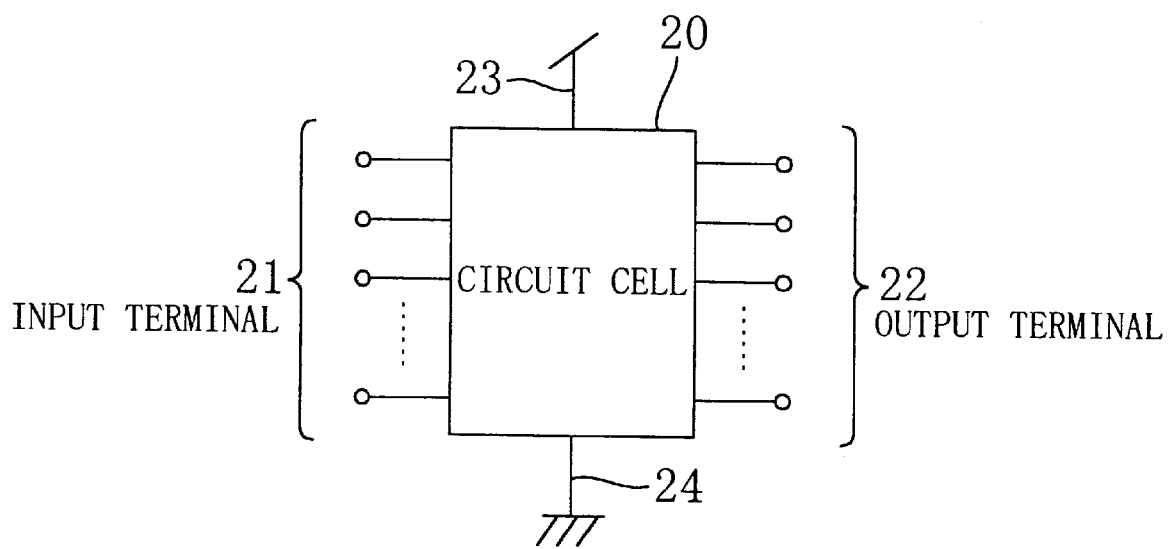
FIG. 2 is a conceptual illustration showing the general construction of a circuit cell.

FIG. 2 is a conceptual illustration showing the general construction of a circuit cell. As shown in FIG. 2, in most cases a circuit cell 20 includes input terminals 21, output terminals 22, a power terminal 23, and a ground terminal 24. In the cell netlists 7, various circuit cell netlists are stored. A circuit cell can be an inverter, a NAND gate, a NOR gate, or a flip-flop which are generally prepared in an ASIC standard cell library. Besides these general purpose circuit cells, another circuit cell which is necessary to compose an LSI can be made and regarded as the object for generating the reliability library 6. As a netlist stored in the cell netlist 7, a SPICE format can be used. The cell netlist 7 includes information on the size and connection of a transistor in each circuit cell and information on the values and connection of a passive element and parasitic element. In a process parameter 5 a SPICE parameter, a parameter for indicating degradation, a manufactural parameter, and the like are stored. The SPICE format and the SPICE parameter are described, for example, in HSPICE USER'S MANUAL (1996) published by META-SOFTWARE.

The reliability library generation device 1 first determines the type of a target circuit cell, and reads the netlist for the target circuit cell from the cell netlist 7. Then, the device 1 drives the circuit reliability simulator 4 and determines the dependence of the degradation degree of the propagation delay between the input and output terminals of the target circuit cell on predetermined operational conditions by referring to a reliability model 3. The circuit reliability simulator 4 estimates the property degradation of transistors through a simulation by referring to the process parameter 5. One such example is described in "Berkeley Reliability Tools - BERT" by Robert H. Tu et al. (IEEE Transactions on Computer-Aided Design of Integrated Circuits and Systems, 1993, P1524–1534).

In the present embodiment, the output load capacitance and the rise and fall times of the input signal of a circuit cell are used as the predetermined operational conditions. In addition, in order to estimate changes in the degradation degree against the elapse of time, the number of switching of the input signal is also added to the operational conditions.

Figure 3:
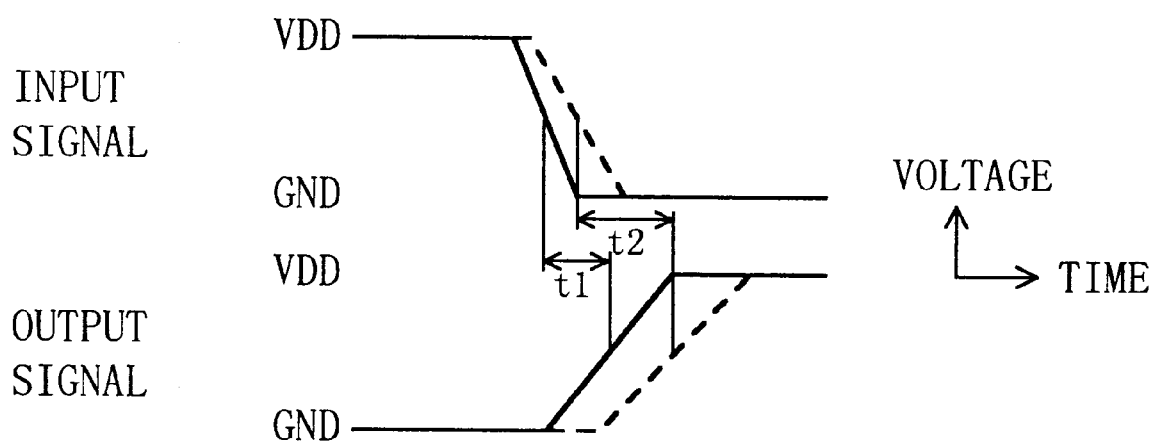
FIG. 3 is an illustration showing the waveforms of input and output signals of an inverter before and after degradation.

The degradation degree of the propagation delay is expressed in the difference between the delay after degradation and the delay before degradation. FIG. 3 shows the waveforms of the input and output signals of an inverter before and after degradation. In FIG. 3, the solid lines represent signal waveforms before degradation and the broken lines represent signal waveforms after degradation. VDD and GND represent supply potential and ground potential, respectively. As shown in FIG. 3, when the delay before degradation is t1 and the delay after degradation is t2, the degradation degree of the propagation delay is expressed in $\Delta t$, which is the difference between the delay after degradation t2 and the delay before degradation t1 as shown in Equation (1). The difference $\Delta t$ is referred to as a delay degradation amount.

$$\Delta t = t2 - t1 \quad (1)$$

The reliability library generation device 1 sets the values of the above-mentioned three operational conditions to respective values, and transfers these values to the circuit reliability simulator 4 together with the information on the netlist of a target circuit cell, and drives the circuit reliability simulator 4. The circuit reliability simulator 4 determines the property degradation degree of each transistor in the target circuit cell. The reliability library generation device 1 receives the property degradation degree of each transistor in the target circuit cell from the circuit reliability simulator 4, and determines the delay degradation amount of the target circuit cell by referring to the reliability model 3. These operations are carried out by changing the values of the three operational conditions within appropriate range, so as to determine the dependence of the delay degradation amount of the target circuit cell on the three operational conditions. The dependence of the delay degradation amount on the operational conditions is expressed in a function or a table, and outputted to the reliability library 6. These operations are carried out in series for all types of circuit cells stored in the cell netlist 7.

As a result, the reliability library 6 is generated which shows the dependence of the property degradation degree of a circuit cell on predetermined operational conditions. In the reliability library 6 according to the present embodiment, the degradation degree of the signal propagation delay between input and output terminals is used as the property degradation degree of a circuit cell, while the rise and fall times of the input signal, the output load capacitance, and the number of switching of the input signal of a circuit cell are used as the predetermined operational conditions.

FIG. 4 shows information on the dependence of the delay degradation amount of a circuit cell on the operational conditions, which is held in the reliability library 6 in accordance with the present embodiment. In FIG. 4, the dependence of the delay degradation amount between an input terminal and an output terminal of a circuit cell on the operational conditions is shown in the form of a table. As shown in FIG. 4, the delay degradation amount [nS] is shown in such a manner as to correspond to each value of the three operational conditions: the number of switching of the input signal [numbers], the rise time of the input signal [nS], and the output load capacitance [fF].

The reliability library 6 can express the information shown in FIG. 4 in the form of a function. In this case, a function equation including unknown quantities may be stored in the reliability model 3, and the unknown quantities may be determined by a curve fitting so that the function can agree to the relationship between each operational condition and the delay degradation amounts shown in the table of FIG. 4.

The delay calculator 12 reads an LSI netlist 9 where the connection information of each circuit cell which composes a target LSI is written, and a delay library 13 where the dependence of the delay of each circuit cell on predetermined operational conditions is written, and calculates the delays of all the circuit cells which compose the target LSI.

The LSI netlist 9 is described in a format such as a DSPF (Detailed Standard Parasitic File), which is written in Cadence Standard Parasitic Format (1993) pp.8–20 by Cadence Design Systems, Inc. To achieve higher accuracy, it is preferable that the LSI netlist 9 includes parasitic element information such as the parasitic capacitance or parasitic resistance of a wire between circuit cells. The delay library 13 uses the output load capacitance and the rise and fall times of the input signal of a circuit cell as predetermined operational conditions. In short, in the delay library 13 the dependence of the delay of each circuit cell on the operational conditions when the LSI has not been degraded is stored.

Figure 5:
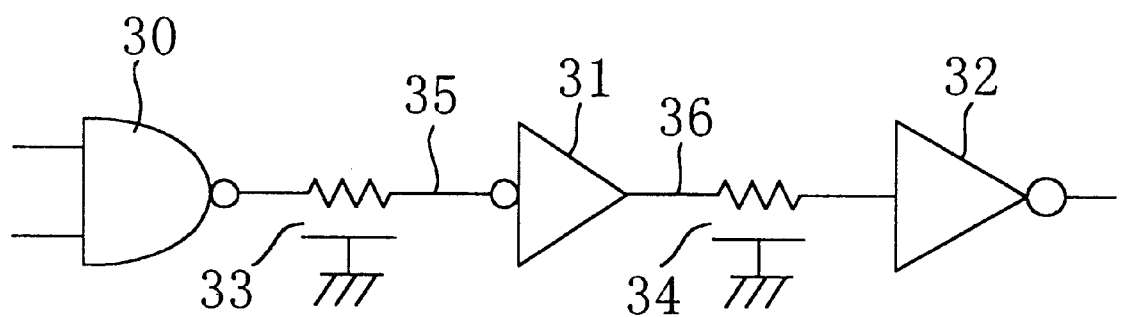
FIG. 5 is an illustration showing an example of an LSI signal path.

As an example, the case of calculating the propagation delay between the input and output terminals of the inverter 31 in the signal path shown in FIG. 5 is taken. The signal path shown in FIG. 5 is written in the LSI netlist 9. First of all, the load capacitance connected to the output terminal 36 of the inverter 31 is determined. In this case, the load capacitance corresponds to the sum of the capacitance of the wiring parasitic element 34 and the input capacitance of the inverter 32 which is connected to the output terminal 36 of the inverter 31. Then, the rise and fall times of the input signal to the input terminal 35 is determined. This is done by determining the rise and fall times of the output signal of a two-input NAND gate 30 when the sum of the capacitance of the wiring parasitic element 33 and the input capacitance of the inverter 31 is regarded as the load capacitance. Thus, the output load capacitance and the rise and fall times of the input signal of the inverter 31 are determined, and based on them, the propagation delay between the input and output terminals of the inverter 31 is calculated by referring to the delay library 13.

The delay calculator 12 performs the above-mentioned operations for the entire circuit cells which compose an LSI, and outputs the results to the before-degradation LSI timing 8. The before-degradation LSI timing 8 is written in a format such as SDF (Standard Delay Format), which is described in Standard Delay Format Specification Version 3.0, 1995 published by Open Verilog International.

An input vector 16 is an LSI input signal pattern written in time series, which is needed to logically simulate an LSI. The logic simulator 15 reads the input vector 16, before-degradation LSI timing 8, and other necessary information, executes a logic simulation by taking the LSI operational timing before degradation into consideration, and outputs the simulation results to the before-degradation result 10.

(Cell Delay Degradation Estimation Process)

The cell delay degradation estimation means 2 determines a target circuit cell from the circuit cells which compose a target LSI, and extracts the values of the above-mentioned operational conditions for the target circuit cell at the operation of the target LSI. To be more specific, the means 2 extracts the output load capacitance 9a from the LSI netlist 9, the rise and fall times of the input signal 8a from the before-degradation LSI timing 8, and the input signal switching number of times 10a from the before-degradation result 10.

The cell delay degradation estimation means 2 then estimates the delay degradation amount of the target circuit cell, based on the extracted operational condition values, by referring to the reliability library 6. When the reliability library 6 shows the dependence of the delay degradation amount of a circuit cell on the operational conditions in the form of a function, the delay degradation amount of the target circuit cell is determined by substituting the extracted operational condition values in the function. On the other hand, when the reliability library 6 shows the dependence of the delay degradation amount of a circuit cell on the operational conditions in the form of a table, the delay degradation amount of the target circuit cell can be determined by conducting proper interpolation in accordance with the extracted operational conditions values. These operations are carried out for all the circuit cells which compose the target LSI, and the results are outputted as the cell delay degradation degree 11.

(LSI Timing Degradation Estimation Process)

The delay calculator 12 makes the LSI timing degradation estimation means 18 read the cell delay degradation degree 11 in addition to the LSI netlist 9 and delay library 13, and calculates the delay of each circuit cell in the above-mentioned LSI which has been degraded with time. Since the LSI netlist 9 and the delay library 13 determine the delay of each circuit cell in the LSI before degradation, the cell delay degradation degree 11 expressed in a difference is added to the determined delay. The sum is outputted as the after-degradation LSI timing 14. Similar to the before-degradation LSI timing 8, the after-degradation LSI timing 14 is written in a format such as SDF.

The logic simulator 15 reads the input vector 16, after-degradation LSI timing 14, and other necessary information in the same manner as the case of the before-degradation LSI, executes a logic simulation by taking the LSI operational timing after degradation into consideration, and outputs the simulation results as the after-degradation result 17.

Thus, according to the present embodiment, the LSI operational simulation after degradation is performed by individually determining the delay degradation degrees of the circuit cells in a target LSI with reference to the reliability library 6, and by estimating the delay of each circuit cell in the LSI which has been degraded with time, based on the determined delay degradation degree of each circuit cell. This enables a simulation to be performed by taking the delay degradation phenomenon of a signal path in the actual operation of the LSI into consideration. Consequently, an LSI specification can be prevented from being designed excessively reliable.

In the present embodiment, the rise and fall times of the input signal in a circuit cell is determined only by the output load capacitance of the circuit cell in the previous stage; however, the effect of the signal waveform changing due to the wire parasitic resistance may be used. By doing so, the rise and fall times of the input signal becomes more accurate.

In the present embodiment, the reliability model 3, which defines a function equation for expressing the dependence of the delay degradation degree of a circuit cell on the operational conditions, is placed outside the reliability library generation device 1. According to this construction, various function equations are prepared so that the reliability library generation device 1 can select a desired function equation. Instead of this, the reliability model 3 may be integrated into the reliability library generation device 1 so as to simplify the apparatus.

In the present embodiment, an inverter having a single input terminal and a single output terminal is used as a circuit cell; however, a circuit cell having a plurality of input or output terminals can be used to estimate the delay degradation degree in the same manner. In this case, it is necessary to estimate the delay degradation degree between each input terminal and each output terminal, that is, the delay degradation degrees for the number of their combinations.

In the present embodiment, in order to estimate the cell delay degradation degree 11, the input signal switching number of times 10a is extracted from the before-degradation result 10, which is the result of a logic simulation. However, according to this method, in order to estimate, for example, degradation after 10-year operations, it is necessary to give the logic simulator 15 the input vector 16 which indicates operations for 10 years. This is non-realistic, so that in actuality the input signal switching number of times 10a can be determined through an approximate calculation by making the input vector 16 express an operation for a certain time period, and by regarding the degradation estimation time period as repetition of this certain time period. When the time period which is shown by the input vector 16 is T1, the number of switching of the input signal in the time period T1 which is expressed by the input vector 16 is N1, and the degradation estimation time period is T2, the input signal switching number of times N2 in a degradation estimation time period T2 can be determined by the following equation.

$$N2=(T2/T1)\cdot N1 \qquad (2)$$

Alternately, the input signal switching number of times N2 in the degradation estimation time period T2 can be determined by executing a logic simulation with the input vector 16 which expresses the operation in the time period T1, by extracting an input signal switching probability P from the before-degradation result 10, and by using the operational frequency f and the degradation estimation time period T2 as follows.

$$N2=T2\cdot f\cdot P \qquad (3)$$

In the present embodiment the cell delay degradation estimation means 2 extracts from the LSI netlist 9 the output load capacitance 9a which is the sum of the wiring capacitance and the input capacitance of a cell. Instead of this, it is possible to extract the wiring capacitance from the LSI netlist 9, and to extract the input capacitance of a cell from the delay library 13 by previously storing the input capacitance thereto, so that the cell delay degradation estimation means 2 add these capacitances and regards the sum as the output load capacitance.

In the present embodiment the before-degradation LSI timing 8 and the after-degradation LSI timing 14 include a delay of a circuit cell only; however, they may also include the wiring delay between circuit cells. In this case, the delay calculator 12 is supposed to read parasitic element information such as wiring resistance or wiring capacitance from the LSI netlist 9, further read the driving property (such as output impedance or output current) of the output terminals from the delay library 13, calculate the delay of the wire which is connected to the output terminals of the circuit cells based on the read information and driving property, and output the calculated results to the before-degradation LSI timing 8 and the after-degradation LSI timing 14. Thus, more accurate logic simulation can be achieved.

Furthermore, it is possible to take the effect of the wiring delay changing due to changes in the property of a degraded circuit cell into consideration by providing the reliability library 6 with the dependence of the amount of the driving property change of the output terminal of a circuit cell on operational conditions, making the cell delay degradation estimation means 2 and the LSI timing degradation estimation means 18 calculate the driving property degradation amount as well as the delay degradation amount, determine the wiring delay based on the driving property after degradation, and output the results to the after-degradation LSI timing 14.

When a circuit cell is a CMOS, it is composed of an N-type MOS transistor and an P-type MOS transistor; however, hot carrier degradation occurs much more intensely in the N-type than the P-type. Therefore, an analysis can be performed by the circuit reliability simulator 4 on the supposition that degradation occurs in N-type only.

(Embodiment 2)

Figure 6:
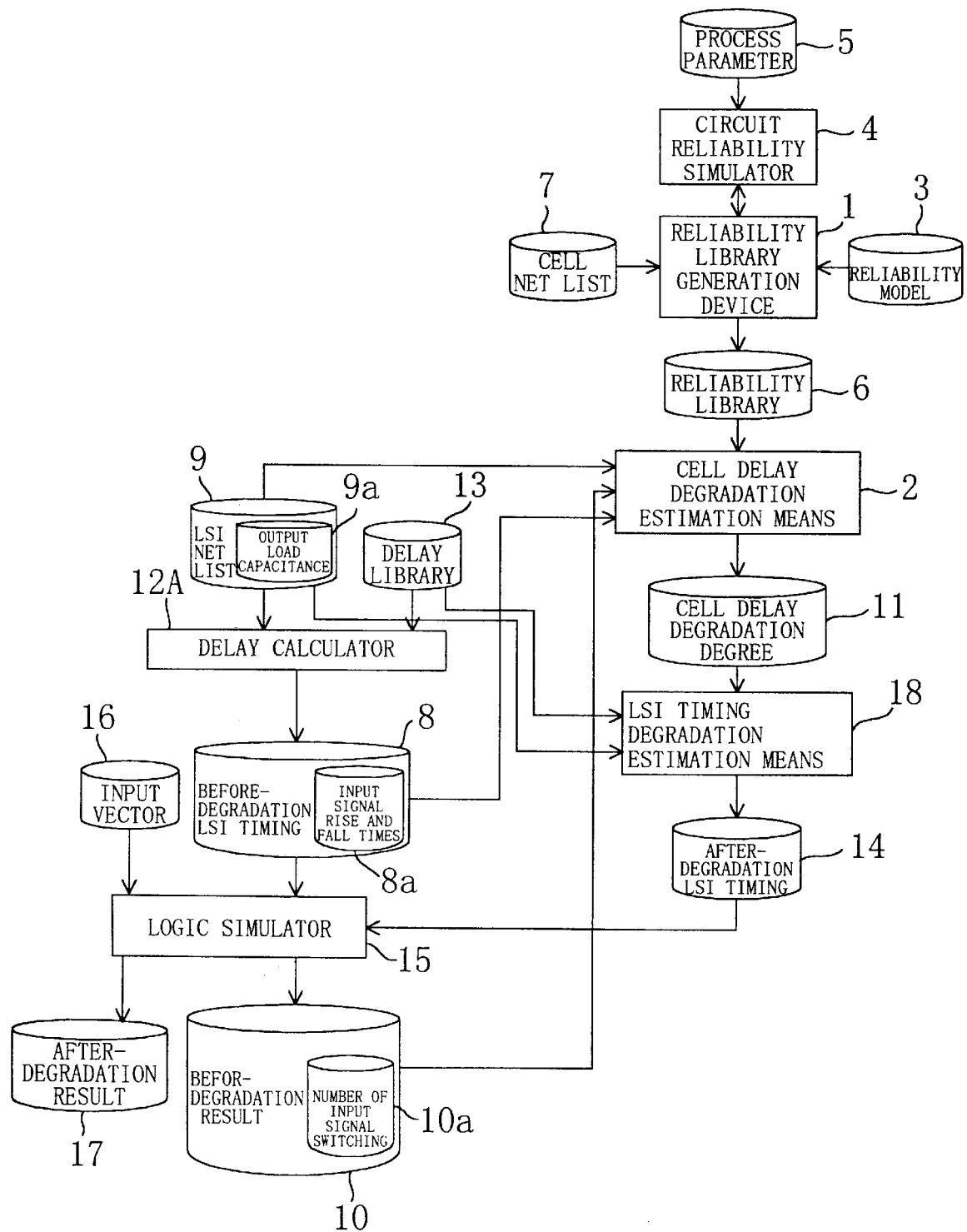
FIG. 6 is a block diagram showing the construction of the LSI timing degradation simulation apparatus in accordance with the second embodiment of the present invention.

FIG. 6 is a block diagram showing the construction of the LSI timing degradation simulation apparatus in accordance with the second embodiment of the present invention. In FIG. 6 the same components as those of the LSI timing degradation simulation apparatus in accordance with the first embodiment shown in FIG. 1 are assigned the common reference numbers.

As shown in FIG. 6 the present embodiment is different from the first embodiment in that the LSI timing degradation estimation means 18 is not included in the delay calculator 12A, but provided apart therefrom. The LSI timing degradation estimation means 18 has the same function as in the first embodiment, and determines the after-degradation LSI timing 14 by referring to the cell delay degradation degree 11 which has been estimated by the cell delay degradation estimation means 2. Since the entire operation of the LSI timing degradation simulation apparatus in accordance with the present embodiment is equal to that of the first embodiment, the detailed description will not be repeated.

Thus, the present embodiment not only has the same effects as those in the first embodiment but also can use a conventional element as the delay calculator 12A.

(Embodiment 3)

Figure 7:
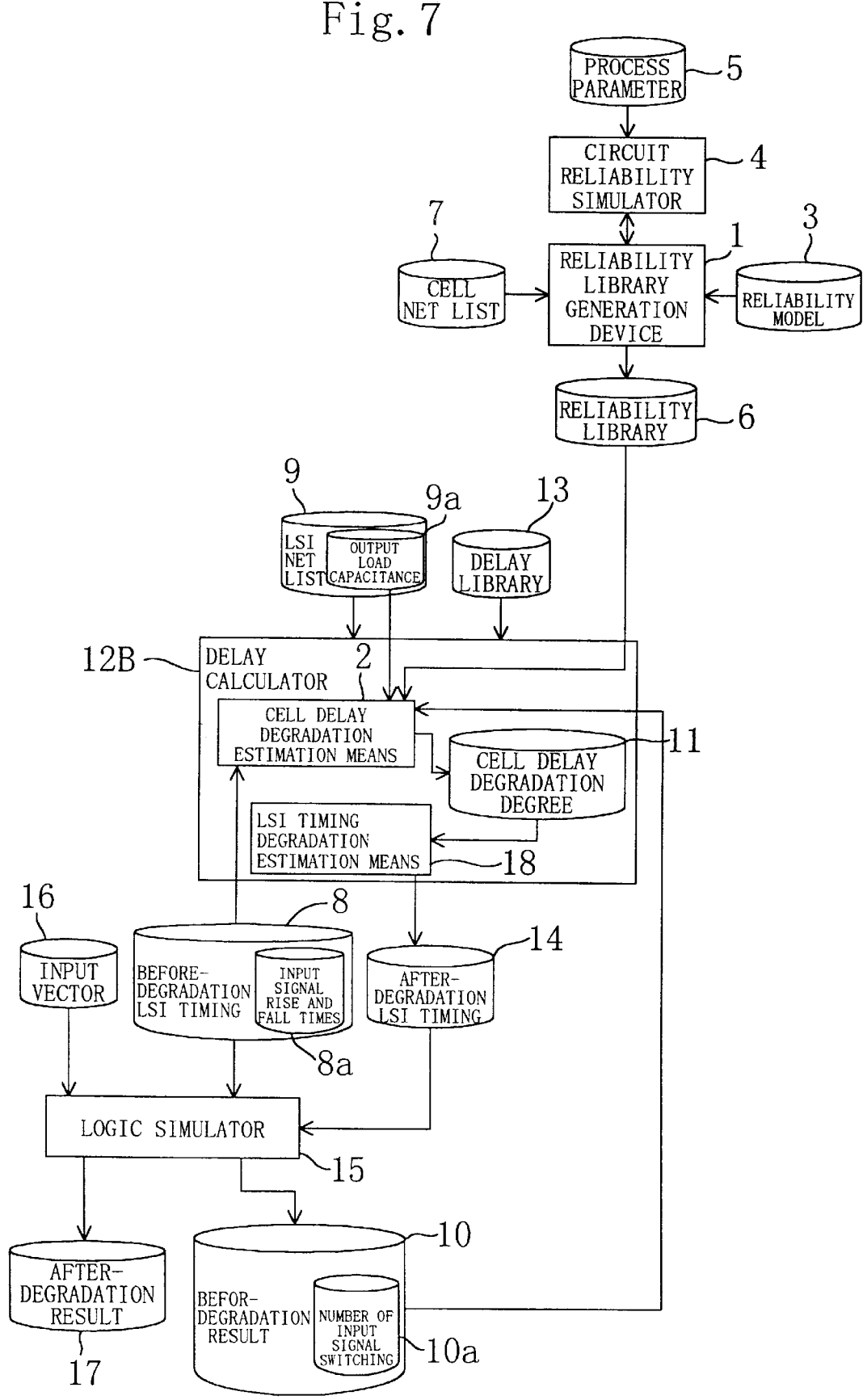
FIG. 7 is a block diagram showing the construction of the LSI timing degradation simulation apparatus in accordance with the third embodiment of the present invention.

FIG. 7 is a block diagram showing the construction of the LSI timing degradation simulation apparatus in accordance with the third embodiment of the present invention. In FIG. 7 the same components as those of the LSI timing degradation simulation apparatus in accordance with the first embodiment shown in FIG. 1 are assigned the common reference numbers.

As shown in FIG. 7 the present embodiment is different from the first embodiment in that the delay calculator 12B includes the cell delay degradation estimation means 2 in addition to the LSI timing degradation estimation means 18, and that the delay calculator 12B determines the after-degradation LSI timing 14 by directly referring to the reliability library 6. Since the entire operation of the LSI timing degradation simulation apparatus in accordance with the present embodiment is equal to that in the first embodiment, the detailed description will not be repeated.

Thus, the present embodiment not only has the same effects as those in the first embodiment but also simplifies the entire construction of the apparatus because the cell delay degradation estimation means 2 is integrated into the delay calculator 12B.

(Embodiment 4)

The LSI timing degradation simulation apparatus in accordance with the fourth embodiment of the present invention has the construction shown in FIG. 1, similar to the first embodiment. However, the present embodiment is different from the first embodiment in that the reliability library 6 shows the dependence of the degradation degree of the rise and fall times of the output signal of a circuit cell on the predetermined operational conditions in addition to the dependence of the delay degradation degree. In other words, in the present embodiment the reliability library generation device 1 also determines the dependence of the degradation degree of the rise and fall times of the output signal of a circuit cell on the predetermined operational conditions, based on the cell netlist 7, by means of the circuit reliability simulator 4.

The following is a description of the operation of the LSI timing degradation simulation apparatus in accordance with the present embodiment. The description will be focused on the difference between the present embodiment and the first embodiment and the rest will be omitted.

Figure 8:
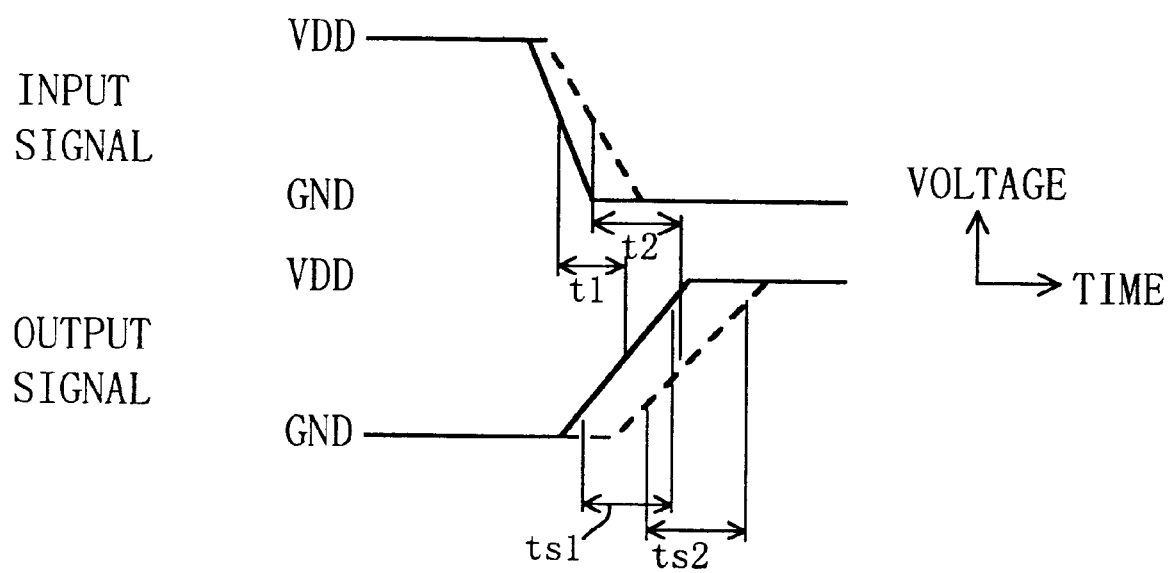
FIG. 8 is an illustration showing the waveforms of input and output signals of an inverter before and after degradation.

FIG. 8 shows the waveforms of the input and output signals of an inverter before and after degradation. In FIG. 8, the solid lines represent signal waveforms before degradation and the broken lines represent signal waveforms after degradation. As shown in FIG. 8, when the inverter has been degraded, the propagation delay between the input and output terminals changes from t1 to t2. In addition, since the driving capability of the output transistor is degraded, the rise and fall times of the output signal also change from ts1 to ts2. In this case, the rise and fall times of the output signal are expressed in the time for the output signal voltage to change from 10% to 90% of the supply voltage VDD.

Therefore, in the present embodiment the reliability library 6 shows the dependence of the degradation degree of the rise and fall times of the output signal of a circuit cell, as the property degradation degree of the circuit cell, on predetermined operational conditions in addition to the dependence of the delay degradation degree. As the predetermined operational conditions, the rise and fall times of the input signal and the output load capacitance of a circuit cell and the number of switching of the input signal are used in the same manner as in the first embodiment. In the present embodiment, in the same manner as the degradation degree of the propagation delay, the degradation degree of the rise and fall times of the output signal of a circuit cell is expressed by the following equation, as the difference $\Delta$ ts between the rise and fall times after degradation ts2 and the rise and fall times before degradation ts1, which is the degradation amount.

$$\Delta ts = ts2 - ts1 \tag{4}$$

The reliability library generation device 1 determines the dependence of the degradation amount of the rise and fall times of the output signal, in addition to the delay degradation amount, on the predetermined operational conditions in the same manner as the case of the delay degradation amount. In other words, the device 1 sets the values of the three operational conditions to respective values and transfers these values to the circuit reliability simulator 4 together with the information on the netlist of a target circuit cell, so as to drive the circuit reliability simulator 4. The circuit reliability simulator 4 determines the property degradation degree of each transistor in the target circuit cell. The reliability library generation device 1 receives the property degradation degree of each transistor in the target circuit cell from the circuit reliability simulator 4, and determines the degradation amount of the rise and fall times of the output signal of the target circuit cell by referring to the reliability model 3. The device 1 performs these operations by changing the values of the three operational conditions within proper range, and determines the dependence of the degradation amount of the rise and fall times of the output signal on the three operational conditions. The dependence of the degradation amount of the rise and fall times of the output signal on the predetermined operational conditions is expressed in the form of a function or a table, and outputted to the reliability library 6. These operations are carried out in series for all types of circuit cells stored in the cell netlist 7.

FIG. 9 shows the information on the dependence of the degradation amount of the rise and fall times of the output signal of a circuit cell on the operational conditions, which is held in the reliability library 6 in accordance with the present embodiment. In FIG. 9 the dependence of the degradation amount of the fall time of the output signal in one output terminal of a circuit cell on the operational conditions is shown in the form of a table. As shown in FIG. 9 the output signal fall time degradation amount [nS] is shown in such a manner as to correspond to each value of the three operational conditions: the input signal switching number of times [numbers], input signal rise time [nS], and output load capacitance [fF]. Similar to the first embodiment, the information shown in FIG. 9 can be expressed in the form of a function.

The cell delay degradation estimation means 2 estimates the delay degradation amount of a target circuit cell by referring to the reliability library 6 which shows the dependence of the delay degradation amount and the dependence of the degradation amount of the rise and fall times of the output signal on the operational conditions.

As an example of the estimation, the delay degradation amount of the inverter 31 in a signal path shown in FIG. 5 is estimated. The cell delay degradation estimation means 2 first specifies a target circuit cell or the inverter 31 and a circuit cell 30 in the previous stage which is connected to the input terminal 35 of the inverter 31, and extracts the values of the operational conditions. The means 2 extracts the output load capacitance 9a from the LSI netlist 9, the input signal rise and fall times 8a from the before-degradation LSI timing 8, and the input signal switching number of times 10a from the before-degradation result 10 for the inverter 31 and the previous stage circuit cell 30.

Then, the cell delay degradation estimation means 2 calculates the degradation amount of the rise and fall times of the output signal of the circuit cell 30 in the previous stage by referring to the reliability library 6, based on the extracted operational condition values. The degradation amount is added to the extracted rise and fall times of the input signal of the inverter 31, and regarded as the rise and fall times of the input signal after degradation. Then, the cell delay degradation estimation means 2 calculates the delay degradation amount of the inverter 31 by referring to the reliability library 6, based on the determined rise and fall times of the input signal after degradation, the output load capacitance 9a and the input signal switching number of times 10a which have already been extracted. These operations are carried out for all cells in the LSI.

Thus, according to the present embodiment the delay degradation amount of a circuit cell is estimated by referring to the reliability library 6 which shows the delay degradation amount and the dependence of the degradation amount of the rise and fall times of the output signal on the operational conditions. Therefore, a simulation can be performed by taking changes in the output signal waveform due to degradation into consideration. Consequently, as compared with the first embodiment where the delay degradation amount of a circuit cell is estimated by referring to the reliability library 6 which shows only the dependence of the delay degradation amount on the operational conditions, without considering changes in the output signal waveform due to degradation, a simulation with more accuracy can be achieved.

(Embodiment 5)

In the LSI timing degradation simulation apparatus in accordance with the fifth embodiment of the present invention, the reliability library 6 shown in FIG. 1 has information on the degradation degree of the rise and fall times of the output signal of a circuit cell, similar to the fourth embodiment. However, the present invention has a feature that the degradation degree is expressed in a ratio between the property value before degradation and the property value after degradation.

To be more specific, the delay degradation degree of a circuit cell is expressed in a ratio of the delay after degradation to the delay before degradation, and the degradation degree of the rise and fall times of the output signal of a circuit cell is expressed in a ratio of the rise and fall times of the output signal after degradation to the rise and fall times of the output signal before degradation.

The following is a description of the operation of the LSI timing degradation simulation apparatus in accordance with the present embodiment. The description will be focused on the difference between the present embodiment and the fourth embodiment and the rest will be omitted.

In the fourth embodiment, as shown in equations (1) and (4), both the degradation degree of a delay and the degradation degree of the rise and fall times of the output signal are expressed in the form of differences. In contrast, in the present embodiment as shown in the equations below, the degradation degree of a delay is expressed in a ratio R of the delay after degradation t2 to the delay before degradation t1, whereas the degradation degree of the rise and fall times of the output signal is expressed in a ratio Rs of the rise and fall times of the output signal after degradation ts2 to the rise and fall times of the output signal before degradation ts1.

$$R = t2/t1 \qquad (5)$$

$$Rs = ts2/ts1 \qquad (6)$$

The reliability library generation device 1 determines the delay degradation degree expressed in a ratio, in the same manner as the case of the delay degradation degree expressed in a difference. To be more specific, similar to the first embodiment the device 1 drives the circuit reliability simulator 4 while changing the values of three operational conditions in appropriate range, so as to determine the dependence of the delay degradation ratio of a target circuit cell on the three operational conditions. In the same manner, the device 1 determines the dependence of the degradation ratio of the rise and fall times of the output signal of a target circuit cell on the three operational conditions.

FIG. 10 shows the information on the dependence of the delay degradation ratio of a circuit cell on the operational conditions, which is held in the reliability library 6 in accordance with the present invention. In FIG. 10, the dependence of the delay degradation ratio between the input and output terminals in a circuit cell on the operational conditions is shown in the form of a table. As shown in FIG. 10 the delay degradation ratio is shown in such a manner as to correspond to each value of the three operational conditions: the input signal switching number of times [numbers], input signal rise time [nS], and output load capacitance [fF]. The dependence of the degradation ratio of the rise and fall times of the output signal on the operation conditions can be expressed in the same manner. Similar to the first embodiment, the information shown in FIG. 10 can be expressed in the form of a function.

The cell delay degradation estimation means 2 estimates the delay degradation ratio of a target circuit cell by referring to the reliability library 6 which shows the dependence of the delay degradation ratio and the dependence of the degradation ratio of the rise and fall times of the output signal on the operational conditions.

As an example of the estimation, the delay degradation ratio of the inverter 31 in a signal path shown in FIG. 5 is estimated. The cell delay degradation estimation means 2 first specifies a target circuit cell or the inverter 31 and a circuit cell 30 in the previous stage which is connected to the input terminal 35 of the inverter 31, and then extracts the values of the operational conditions. The means 2 extracts the output load capacitance 9*a* from the LSI netlist 9, the input signal rise and fall times 8*a* from the before-degradation LSI timing 8, and the input signal switching number of times 10*a* from the before-degradation result 10 for the inverter 31 and the previous stage circuit cell 30.

Based on the extracted operational condition values, the cell delay degradation estimation means 2 calculates the degradation ratio of the rise and fall times of the output signal of the circuit cell 30 in the previous stage by referring to the reliability library 6. The degradation ratio Rs is multiplied by the rise and fall times of the input signal of the inverter 31 which have been already extracted, and is regarded as the rise and fall times of the input signal after degradation. Then, the cell delay degradation estimation means 2 calculates the delay degradation ratio of the inverter 31 by referring to the reliability library 6, based on the determined rise and fall times of the input signal after degradation, and the output load capacitance 9*a* and the input signal switching number of times 10*a* which have been already extracted.

The LSI timing degradation estimation means 18 reads the cell delay degradation degree 11 which is expressed in a delay degradation ratio in addition to the LSI netlist 9 and the delay library 13, and calculates the delay of each circuit cell in the LSI which has been degraded with time. The LSI netlist 9 and the delay library 13 determine a delay in the LSI before degradation, and the determined delay is multiplied by the cell delay degradation degree 11 which is expressed in a ratio. The resulting product is outputted as the after-degradation LSI timing 14. The after-degradation LSI timing 14 is also written in a format such as SDF in the same manner as the before-degradation LSI timing 8.

Thus, according to the present embodiment the delay degradation degree is expressed in relative information of a ratio in the cell delay degradation degree 11, so that precision simulation can be performed even in a case where the delay library 13 and the reliability library 6 are generated by using different process parameters from each other.

(Embodiment 6)

Figure 11:
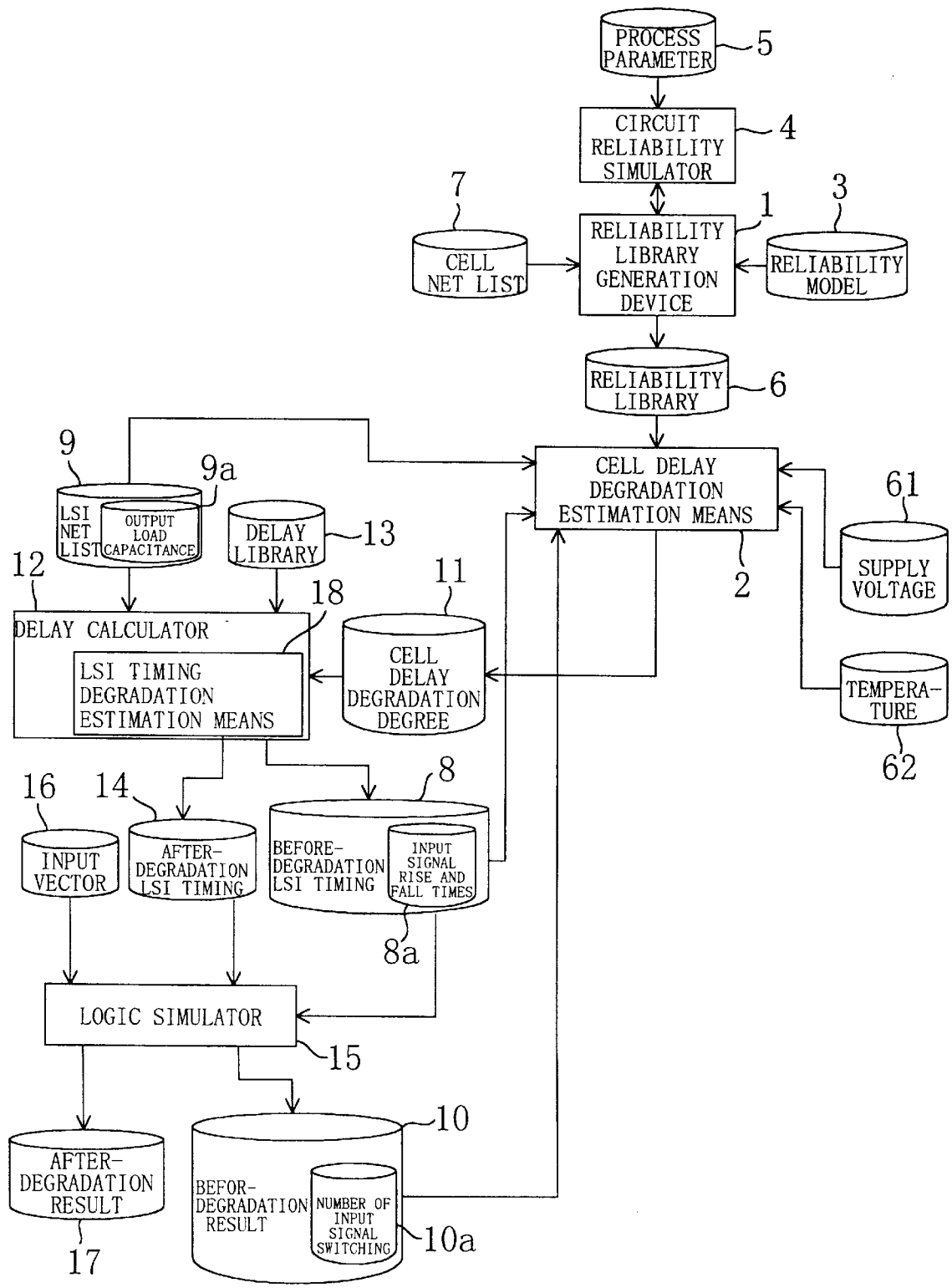
FIG. 11 is a block diagram showing the construction of the LSI timing degradation simulation apparatus in accordance with the sixth embodiment of the present invention.

FIG. 11 shows the construction of the LSI timing degradation simulation apparatus in accordance with the sixth embodiment of the present invention. The apparatus in accordance with the present embodiment has the same construction as the apparatus in accordance with the first embodiment except that the reliability library 6 additionally has information on the dependence of the delay degradation degree of each circuit cell on the supply voltage impressed on the circuit cells and the temperature. Thus, in the present embodiment the reliability library generation device 1 determines the dependence of the degradation degree of the signal propagation delay of a circuit cell and the rise and fall times of the output signal on predetermined operational conditions at various supply voltages and temperatures, based on the cell netlist 7, by means of the circuit reliability simulator 4.

The following is a description of the operation of the LSI timing degradation simulation apparatus in accordance with the present embodiment. The description will be focused on the difference between the present embodiment and the first embodiment, and the rest will be omitted.

The reliability library generation device 1 determines the dependency of the delay degradation amount on operational conditions by changing the level of supply voltage impressed on a circuit cell or temperature in appropriate range, and by further changing the three operational conditions within appropriate range in the same manner as in the first embodiment at different levels of supply voltage or temperature. The determined dependence of the delay degradation amount on the operational conditions at each supply voltage or temperature is expressed in the form of a function or a table, and outputted to the reliability library 6. These operations are carried out in series for all types of circuit cells.

FIG. 12 shows information on the delay degradation degree of a circuit cell which is held in the reliability library 6 in accordance with the present embodiment. In FIG. 12, the dependence of the delay degradation amount between an input terminal and an output terminal in a circuit cell on the operational conditions at each supply voltage is shown in the form of a table.

Given a predetermined supply voltage 61, the cell delay degradation estimation means 2 generates a table or a function equation which shows the dependence of the delay degradation amount on the operational conditions at the supply voltage 61, by means of interpolation or the like, based on the information shown in FIG. 12 which is held by the reliability library 6. The operations hereafter are the same as in the first embodiment; however, the delay library 13 must be generated in advance at the predetermined supply voltage 61.

FIG. 13 shows information on the delay degradation degree of a circuit cell which is held in the reliability library 6 in accordance with the present embodiment, and the information shows the dependence of the delay degradation amount between an input terminal and an output terminal in a circuit cell on the operational conditions at each temperature is shown in the form of a table.

Given a predetermined temperature 62, the cell delay degradation estimation means 2 generates a table or a function equation which shows the dependence of the delay degradation amount on the operational conditions at the temperature 62, by means of interpolation or the like, based on the information shown in FIG. 13 which is held in the reliability library 6. The operations hereafter are the same as in the first embodiment; however, the delay library 13 must be generated in advance at the predetermined temperature 62.

Thus, according to the present embodiment the dependence of LSI degradation on supply voltage or temperature can be taken into consideration, so that the operation of an LSI after degradation can be analyzed within the range of operational supply voltage or operational temperature.

In the present embodiment, the dependence of LSI degradation on supply voltage and the dependence on a temperature are considered separately; however, they may be considered in combination. In this case, the reliability library 6 should prepare the information shown in FIG. 13 for each supply voltage.

In addition, as a predetermined supply voltage or temperature, a single value may be set respectively for an LSI, or a single value may be set for each circuit cell from various values.

(Embodiment 7)

According to the seventh embodiment of the present invention, when the degradation of the signal propagation delay between an input terminal and an output terminal of a circuit cell having a plurality of input terminals is determined, the rise and fall times of the input signal and the number of switching of the input signal to another input terminal are also referred to.

Figure 14:
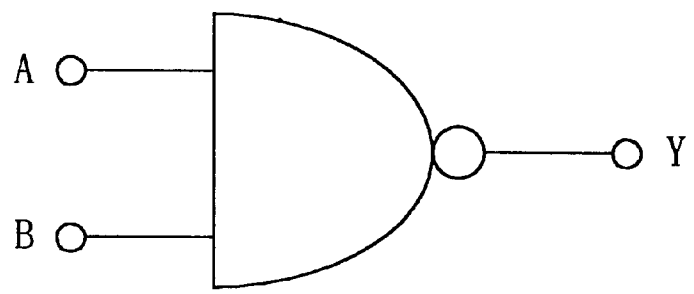
FIG. 14 is an illustration showing a two-input NAND gate as a circuit cell having a plurality of input terminals in accordance with the seventh embodiment of the present invention.
Figure 15:
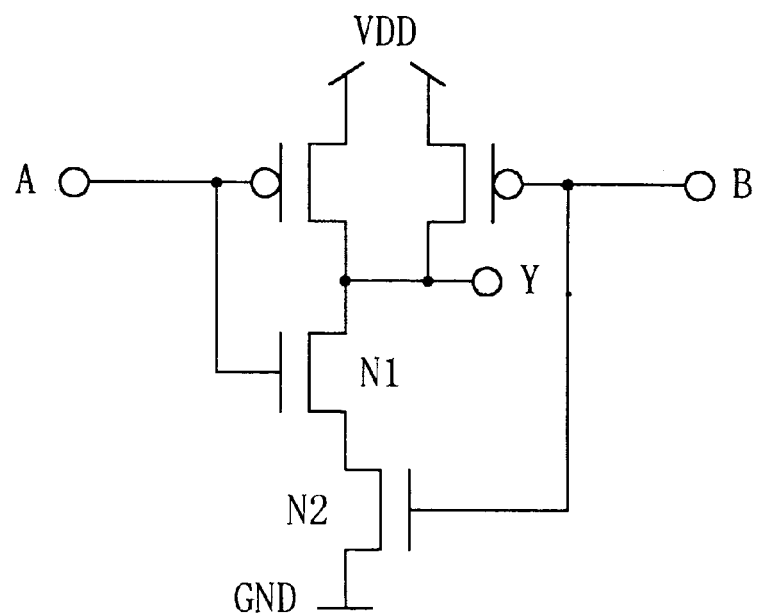
FIG. 15 is a circuit diagram of the two-input NAND gate shown in FIG. 14 in a transistor level.

As a circuit cell, the case of a two-input NAND gate shown in FIG. 14 is taken. In FIG. 14, A and B represent input terminals and Y represents an output terminal. FIG. 15 shows the transistor level circuit diagram of the two-input NAND gate shown in FIG. 14 assuming the case of the CMOS gate.

In the two-input NAND gate shown in FIG. 14, the degradation of the signal propagation delay between the input terminal A and the output terminal Y depends on the switching history of the input signal (hereinafter input signal B) to the input terminal B. On the other hand, the degradation of the signal propagation delay between the input terminal B and the output terminal Y depends on the switching history of the input signal (hereinafter input signal A) to the input terminal A. Since the current mainly runs through the circuit where the N-type MOS transistors N1 and N2 shown in FIG. 15 are connected in series when an output signal falls, the degradation degree of the signal propagation delay is affected by the degradation degree of the N-type MOS transistors N1 and N2.

Therefore, in the present embodiment the reliability library generation device 1 generates the reliability library 6 which takes the dependency of the number of switching of the input signals A and B into consideration.

Figures 16, 17:
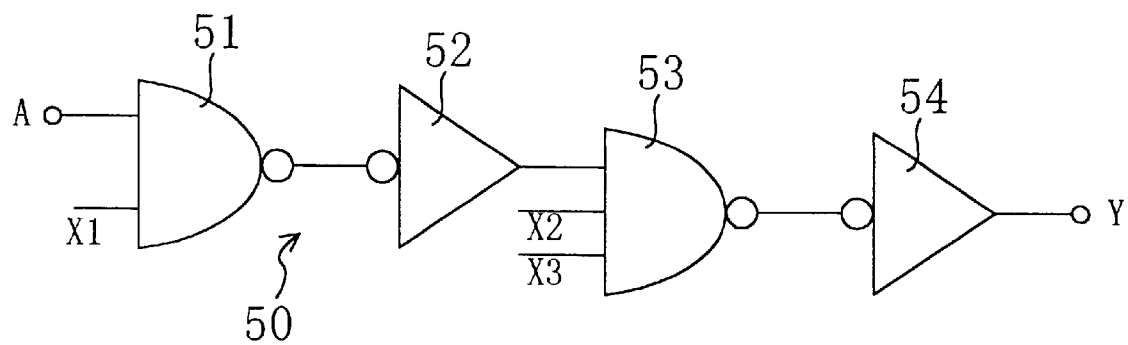
FIG. 16 is an example of information held in the reliability library in accordance with the seventh embodiment of the present invention.
FIG. 17 is an example of a signal path composed of a plurality of circuit cells, which is regarded as a process unit in the eighth embodiment of the present invention.

FIG. 16 shows information held in the reliability library 6 in accordance with the present embodiment. In FIG. 16, Tis represents rise and fall times of the input signal, and Cl represents an output load capacitance. Each table n (Tis, Cl) (n=1~9) represents a table which shows the degradation degree of the signal propagation delay between the input terminal A and the output terminal Y, which has been made by setting the number of switching of the input signal A to the values indicated above them and setting the number of switching of the input signal B to the values indicated at the left, thereby properly changing the input signal rise and fall times Tis and the output load capacitance Cl.

The cell delay degradation estimation means 2 extracts the input signal switching number of times 10a from the before-degradation result 10. For example, when the number of switching of the input signals A and B are $10^{13}$ and $10^{15}$, respectively, in the input signal switching number of times 10a, the cell delay degradation estimation means 2 selects the table 7. On the other hand, when the means 2 has extracted the number of switching which does not correspond to any table of the reliability library 6, an appropriate table is obtained by interpolation or another method.

Thus, according to the present embodiment, the degradation degree of the signal propagation delay between an input terminal and an output terminal of a circuit cell having a plurality of input terminals can be determined by taking the rise and fall times of the input signal and the number of switching of the input signal in another input terminal into consideration. Consequently, the simulation can be more accurate than that in the first embodiment.

In the present embodiment the information held in the reliability library 6 is shown in the form of a table; however, it may be shown in the form of a function.

In the present invention, tables are prepared in the reliability library 6 under the supposition that the rise and fall times of the input signal are equal both in the input terminals A and B. However, tables may be prepared under the condition that the input signals A and B have different rise and fall times from each other. In this case each table has to have more dimensions such as table n (Tisa, Tisb, Cl). Here, Tisa and Tisb represent the rise and fall times of the inputs signals A and B, respectively.

(Embodiment 8)

The eighth embodiment of the present invention has a feature of using a signal path consisting of a plurality of circuit cells, such as a critical path as a unit of delay estimation, instead of a circuit cell.

FIG. 17 shows a signal path which is used as a unit of delay estimation in the present embodiment. The signal path 50 which extends between the input terminal A and the output terminal Y consists of four-stage circuit cells 51, 52, 53, and 54 which are connected in series. One of the input terminals of the two-input NAND gate 51 is connected with the input terminal A. The input terminal of the inverter 52 is connected with the output terminal of the two-input NAND gate 51. One of the input terminals of the three-input NAND gate 53 is connected with the output terminal of the inverter 52. The input terminal and the output terminal of the inverter 54 are connected with the output terminal of the three-input NAND gate 53 and the output terminal Y, respectively.

In a circuit cell having a plurality of input terminals, such as the two-input NAND gate 51 or the three-input NAND gate 53, the logical values of the terminals X1, X2, and X3 which are unrelated to the signal path 50 in question are fixed so that a signal runs along the signal path 50. In the signal path 50 shown in FIG. 17, the logical values of the signals on the terminals X1, X2, and X3 are fixed to "1".

In the present embodiment the signal path 50 shown in FIG. 17 is treated as one circuit cell having the input terminal A and the output terminal B. In the other points, the present embodiment has the same construction as the first embodiment.

To be more specific, the cell delay degradation estimation means 2 estimates the delay degradation degrees of at least some of the circuit cells which compose an LSI, by using a signal path consisting of a plurality of circuit cells as a unit. The LSI timing degradation estimation means 18 estimates the delay of the above-mentioned signal path in an LSI which has been degraded with time, based on the cell delay degradation degree 11 including the delay degradation degree of a signal path which has been estimated by the cell delay degradation estimation means 2. Then, the operation of the LSI after degradation is simulated, based on the after-degradation LSI timing 14 including the delay of the signal path in the degraded LSI. In the operation of the LSI timing degradation estimation means 18, it is necessary to make the LSI netlist 9 hold the definition information on the signal path shown in FIG. 17 in such a manner that the LSI netlist 9 and the cell delay degradation degree 11 correspond to each other.

Thus, according to the present embodiment, a signal path consisting of a plurality of circuit cells such as a critical path is treated as a unit of delay estimation. This can simplify the delay estimation and reduce the entire calculation process amount, as compared with the first embodiment where the delays of all the signal paths in an LSI are estimated by using a circuit cell as unit.

In the present embodiment, the signals on the terminals X1, X2, and X3 which are unrelated to a signal path in question are fixed; however, the actual number of switching of the signals may be utilized for the delay estimation of the signal path.

In the present embodiment the signal path 50 is composed of circuit cells of a minimum unit; however it may have a multiple hierarchical structure.

(Embodiment 9)

A circuit cell which holds data, such as a flop-flop or latch may operate correctly or wrongly, depending on the phase relationship between an input data signal and a clock signal for taking in the input data or the validity periods of the input data signal and the clock signal. Therefore, the limit values of the phase relationship or the validity periods are determined in advance, so as to avoid the wrong operation of the circuit cells, and a logic simulator 15 is used to check whether the phase relationship or the validity period of each circuit cell in an LSI do not exceed the limit values. The predetermined limit values for the phase relationship or the validity periods are referred to as timing constraints.

The timing constraints include setup time, hold time, minimum pulse width, recovery time, removable time, and release time.

In the case of a flip-flop, for example, the setup time defines how early the input data signal has to be decided before the clock signal becomes valid. The hold time defines how long the input data signal has to be held after the clock signal becomes valid. The minimum pulse width refers to a minimum value of the validity period (pulse width) of a clock signal which enables a circuit cell to operate properly.

Since such timing constraints depend on the signal propagation condition in a circuit cell, the signal propagation condition changes as the transistor property in the circuit cell degrades with time. Consequently, it is necessary to change the timing constraints accordingly.

According to the ninth embodiment of the present invention, the degradation degree of not only the delay of a circuit cell but also of the timing constrains in the circuit cell are estimated, and the timing constrains after degradation are determined based on the degradation degree of the estimated timing constrains of the circuit cell, so as to examine the LSI operation timing.

Figure 18:
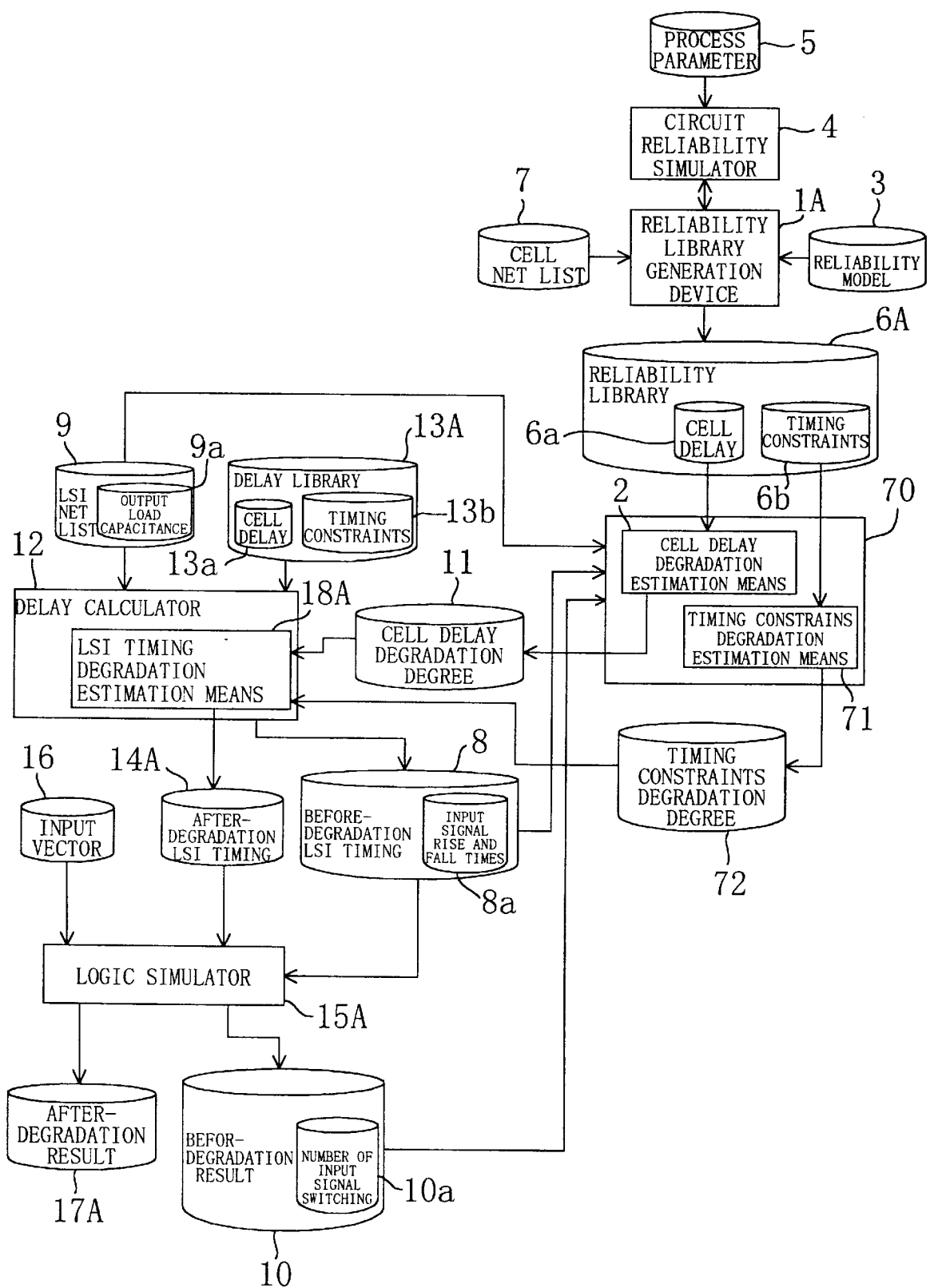
FIG. 18 is a block diagram showing the construction of the LSI timing degradation simulation apparatus in accordance with the ninth embodiment of the present invention.

FIG. 18 shows the construction of the LSI timing degradation simulation apparatus in accordance with the ninth embodiment of the present invention. As shown in FIG. 18, the LSI timing degradation simulation apparatus according to the present embodiment comprises a timing constraints degradation estimation means 71 for estimating a timing constraints degradation degree 72 from timing constraints information (timing constraints 6b) held in the reliability library 6A. Furthermore, the cell delay degradation estimation means 2 and the timing constraints degradation estimation means 71 composes a degradation estimation means 70. The cell delay information (cell delay 6a) which is held in the reliability library 6A contains the same information as that held in the reliability library 6 in accordance with the first to eighth embodiments. The delay library 13A includes cell delay information (cell delay 13a) and timing constraints information (timing constraints 13b), and the cell delay 13a contains the same information as the delay library 13 in accordance with the first to eighth embodiments.

The following is a description of the generation of the timing constraints 13b in the delay library 13A. As an example, the case of the setup time of a flip-flop will be described.

A time td when the input data signal becomes valid is swept at an appropriate time interval, before a time tc when the clock signal becomes valid (the phase difference between clock and input data is changed), so as to determine, as setup time, the limit time difference (tc–td) which enables input data to be properly taken into the flip-flop.

The timing constraints such as setup time is affected by the rise and fall times of the clock signal and the input data signal (about setup time of a circuit cell which becomes valid when the clock signal is the logical value "1", the fall time of the clock signal is unnecessary), and the supply voltage and temperature of a circuit cell. Therefore, timing constraints are determined by regarding these as operational conditions and by changing each of the operational conditions within appropriate range, and as a whole, the dependence of the timing constraints on the operational conditions is determined. Usually, the delay library generation device (not shown) drives a circuit simulator (not shown, different from the circuit reliability simulator 4) such as SPICE, so as to perform the above-mentioned analysis.

Thus, the delay library generation device determines the dependence of the timing constraints of a circuit cell such as a flip-flop and latch on the operational conditions, and outputs the dependence to the delay library 13A together with the information on the dependence of delay of the circuit cell on the operational conditions.

FIG. 19 is an example of information contained in the timing constraints 13b of the delay library 13A, and shows the dependence of the setup time of a flip-flop before degradation on the operational conditions. In FIG. 19, Tisck and Tisd represent the rise time of the clock signal and the rise time of the input data signal, respectively. In FIG. 19 the supply voltage and the temperature are fixed.

The following is a description of the generation of the timing constraints 6b in the reliability library 6A.

The degradation degree of the timing constraints is affected not only by the rise and fall times of the clock signal and input data signal and the supply voltage and temperature of a circuit cell, but also by the number of switching of the clock signal and input data signal. Therefore, timing constraints are determined by using them as operational conditions and by changing each of the operational conditions within appropriate range, and as a whole, the dependence of the degradation degree of the timing constraints on the operational conditions is determined.

Here, the degradation degree of the timing constraints is expressed in the difference Δtt between the timing constraints after degradation tt2 and the timing constraints before degradation tt1, that is, the timing constraints degradation amount.

$$\Delta tt = tt2 - tt1 \tag{7}$$

The reliability library generation device 1A sets the value of each operational condition to a certain value, and transfers the value to the circuit reliability simulator 4 together with the information on the netlist 7 of a target circuit cell which has already been read, thereby driving the circuit reliability simulator 4. The circuit reliability simulator 4 determines the property degradation degree of each transistor in the target circuit cell. The reliability library generation device 1A receives the property degradation degree of each transistor in the target circuit cell from the circuit reliability simulator 4, and determines the timing constraints degradation amount of the target circuit cell, by referring to the reliability model 3.

Taking the case of the degradation amount of the setup time of a flip-flop, a time td when an input data signal becomes valid is swept at an appropriate time interval before a time tc when a clock signal becomes valid, so as to determine, as setup time, the limit time difference (tc−td) which enables input data to be properly taken into the flip-flop. The degradation amount is determined by the difference between the time difference before degradation and the time difference after degradation.

By performing these operations while changing the value of each operational condition within appropriate range, the dependence of the degradation amount of the timing constraints of the above-mentioned circuit cell on the operational conditions is determined. The dependence of the degradation amount of the timing constraints on the operational conditions is expressed in a function or a table, and outputted to the timing constraints 6b of the reliability library 6A. These operations are carried out in series for each applicable circuit cell stored in the cell netlist 7 (only limited number of circuit cells such as a flip-flop or latch need the timing constraints).

FIGS. 20 and 21 show examples of information contained in the timing constraints 6b of the reliability library 6A, and the information shows the dependence of the degradation amount of a setup time of a flip-flop on the operational conditions. In FIG. 20, Tisck and Tisd represent the rise and fall times of the clock signal and input data signal, respectively. Each table n (Tisck, Tisd) (n=1~9) represents a table which shows the degradation degree of the setup time, which has been made by setting the number of switching of the clock signal to the values indicated above them and setting the number of switching of the input data signal to the values indicated at the left, thereby properly changing the clock signal rise and fall times Tisck and the input data signal rise and fall times Tisd. In FIG. 21 (a) and (b) show an example of table 1, and an example of table 2, respectively. In FIGS. 20 and 21 the supply voltage and temperature are fixed.

The timing constraints degradation estimation means 71 determines the timing constraints degradation degree 72 from the timing constraints 6b of the reliability library 6A.

Firstly, the means 71 extracts circuit cells (a flip-flop or latch) which need to determine the timing constraints after degradation from the LSI netlist 9. Then the degradation degree of the timing constraints of all the extracted circuit cells are determined as follows.

As for the extracted circuit cells, the timing constraints degradation estimation means 71 refers to the input signal rise and fall times 8a which are contained in the before-degradation LSI timing 8, and serially extracts the rise and fall times of a clock signal or input data signal which are needed to determine the degradation amount of the timing constraints. In addition, for each extracted circuit cell, the timing constraints degradation estimation means 71 refers to the input signal switching number of times 10a which are included in the before-degradation result 10 and serially extracts the number of switching of the clock signal or input data signal which are needed to determine the degradation amount of the timing constraints.

Then, the timing constraints degradation estimation means 71 refers to the timing constraints 6b of the reliability library 6A, that is, the dependence of the degradation amount of the timing constraints on the operational conditions, and determines the degradation amount of the timing constraints of each of the circuit cells from the rise and fall times and the number of switching of the clock signal or input data signal which have been extracted. In this case, when the timing constraints 6b are expressed in the form of a table, the degradation amount is determined by interpolation or the like. The determined degradation amount of the timing constraints of each circuit cell is outputted to the timing constraints degradation degree 72.

The LSI timing degradation estimation means 18A determines the timing constraints in a degraded LSI by adding the timing constraints degradation degree 72 which is expressed in a difference to the timing constraints 13b of the delay library 13A which are the timing constraints in an LSI before degradation, and outputs them to the after-degradation LSI timing 14A.

Since the logic simulator 15A can estimate changes in the clock signal and input data signal of a flip-flop or latch in a degraded LSI by means of a logic simulation, it examines whether the circuit cells in the degraded LSI properly operate, based on the timing constraints contained in the after-degradation LSI timing 14A.

Suppose that the time difference (tc−td) between a time tc when the clock signal become valid and a time td when the input data signal becomes valid, which is 3.0 [nS] before degradation has turned out to be 2.2 [nS] after degradation as a result of a logic simulation based on the after-degradation LSI timing 14A. In addition, suppose that the setup time as timing constraints is 2.1 [nS] before degradation and has become 2.5 [nS] after degradation. Since the time difference (tc−td) before degradation is larger than the setup time, the flip-flop is regarded to operate normally. However, the time difference (tc−td) after degradation is smaller than the setup time by 0.3 [nS](=2.5−2.2), so that the flip-flop does not satisfy the timing constraints and is regarded to operate wrongly. The logic simulator 15A outputs these determination results to the after-degradation result 17A.

In each embodiment, the LSI timing degradation simulation apparatus comprises the reliability library generation device 1; however, the reliability library generation device 1 and 1A are not essential to the present invention. The present invention can be achieved by employing an LSI timing degradation simulation apparatus which simulates the operation of an LSI after degradation by referring to the reliability libraries 6 and 6A which have been prepared in advance.

What is claimed is:

1. An LSI timing degradation simulation apparatus which predicts LSI degradation with time at a design stage and simulates an LSI operation after degradation, said LSI timing degradation simulation apparatus comprising:

a cell delay degradation estimation means for estimating a delay degradation degree with time of each circuit cell where at least one of a plurality of circuit cells compose a target LSI, by referring to a reliability library which shows dependence of a property degradation degree of a circuit cell on predetermined operational conditions, based on values of said predetermined operational conditions about said circuit cell at an operation of said target LSI: and an LSI timing degradation estimation means for estimating a delay of each circuit cell in said target LSI which has been degraded with time, based on the delay degradation degree of each circuit cell in said target LSI estimated by said cell delay degradation estimation means, wherein the operation of said target LSI after degradation is simulated based on the delay of each circuit cell in said degraded target LSI estimated by said LSI timing degradation estimation means, wherein said reliability library uses, as said property degradation degree of a circuit cell, a degradation degree of a signal propagation delay between an input terminal and an output terminal of said circuit cell, wherein said reliability library uses, as said predetermined operational conditions, the rise and fall times of the input signal, the output load capacitance, and the number of switching of the input signal of a circuit cell.

2. The LSI timing degradation simulation apparatus according to claim 1, wherein said reliability library uses, for a degradation degree of a signal propagation delay between one input terminal-and an output terminal of a circuit cell having a plurality of input terminals, the number of switching and the rise and fall times of the input signal to another input terminal as said predetermined operational conditions.

3. The LSI timing degradation simulation apparatus according to claim 1, wherein said reliability library uses a supply voltage impressed on a circuit cell as said predetermined operational conditions.

4. The LSI timing degradation simulation apparatus according to claim 1, wherein said reliability library uses a temperature of a circuit cell as said predetermined operational conditions.

5. The LSI timing degradation simulation apparatus according to claim 1, wherein said reliability library uses, as said property degradation degree of a circuit cell, a degradation degree of the rise and fall times of the output signal of said circuit cell.

6. The LSI timing degradation simulation apparatus according to claim 1, wherein said reliability library shows dependence of timing constraints of a circuit cell including at least setup time and hold time on predetermined operational conditions, wherein said LSI timing degradation simulation apparatus comprises;

a timing constraints degradation estimation means for estimating a degradation degree of timing constraints of the circuit cell which composes said target LSI, by referring to said reliability library, based on values of said predetermined operational conditions about said circuit cell at the operation of said target LSI, and said LSI timing degradation estimation means estimates the timing constraints of said circuit cell in said target LSI degraded with time, based on the degradation degree of the timing constraints of said circuit cell estimated by said timing constraints degradation estimation means, and whether or not said circuit cell operates normally in said target LSI after degradation is estimated based on the timing constraints of said circuit cell in said degraded target LSI estimated by said LSI timing degradation estimation means.

7. The LSI timing degradation simulation apparatus according to claim 1, wherein said reliability library shows the dependence of said property degradation degree of a circuit cell on said predetermined operational conditions in a form of a table.

8. The LSI timing degradation simulation apparatus according to claim 1, wherein said reliability library shows the dependence of said property degradation degree of a circuit cell on said predetermined operational conditions in a form of a function.

9. The LSI timing degradation simulation apparatus according to claim 1, wherein said reliability library shows said property degradation degree of a circuit cell in a form of a difference between a property value before degradation and a property value after degradation, and said cell delay degradation estimation means shows said delay degradation degree of each circuit cell in a form of a difference between a delay before degradation and a delay after degradation.

10. The LSI timing degradation simulation apparatus according to claim 1, wherein said reliability library shows said property degradation degree of a circuit cell in a form of a ratio of a property value after degradation to a property value before degradation, and said cell delay degradation estimation means shows said delay degradation degree of each circuit cell in a form of a ratio of a delay after degradation to a delay before degradation.

11. The LSI timing degradation simulation apparatus according to claim 1, wherein said cell delay degradation estimation means estimates said delay degradation degree of at least one of the said plurality of circuit cells which compose said target LSI, by using a signal path consisting of a plurality of circuit cells as a unit;

said LSI timing degradation estimation means estimates a delay of said signal path in said target LSI which has been degraded with time, based on said delay degradation degree of said signal path estimated by said cell delay degradation estimation means; and said LSI timing degradation simulation apparatus simulates the operation of said target LSI after degradation, based on the delay of said signal path in said degraded target LSI estimated by said LSI timing degradation estimation means.

12. A method of simulating an LSI operation after degradation by predicting LSI degradation with time at a design stage, said method comprising the steps of:

estimating a delay degradation degree with time of each circuit cell which composes a target LSI, by referring to a reliability library which shows dependence of a property degradation degree of a circuit cell on predetermined operational conditions, based on values of said predetermined operational conditions about said circuit cell at the operation of said target LSI:

estimating a delay of each circuit cell in said target LSI which has been degraded with time, based on said estimated delay degradation degree of each circuit cell in said target LSI; and simulating the operation of said target LSI after degradation, based on said estimated delay of each circuit cell in said degraded target LSI wherein said reliability library uses, as said property degradation degree of a circuit cell, a degradation degree of a signal propagation delay between an input terminal and an output terminal of said circuit cell, wherein said reliability library uses, as said predetermined operational conditions, the rise and fall times of he input signal, output load capacitance, and the number of switching of the input signal of a circuit cell.

13. The method of simulating an LSI operation after degradation according to claim 12, wherein said reliability library uses, for a degradation degree of a signal propagation delay between one input terminal and an output terminal of a circuit cell having a plurality of input terminals, the number of switching and the rise and fall times of the input signal to another input terminal, as said predetermined operational conditions.

14. The method of simulating an LSI operation after degradation according to claim 12, wherein said reliability library uses a supply voltage impressed on a circuit cell as said predetermined operational conditions.

15. The method of simulating an LSI operation after degradation according to claim 12, wherein said reliability library uses a temperature of a circuit cell as said predetermined operational conditions.

16. The method of simulating an LSI operation after degradation according to claim 12, wherein said reliability library uses a degradation degree of the rise and fall times of the output signal as said property degradation degree of a circuit cell.

17. The method of simulating an LSI operation after degradation according to claim 12, wherein said cell delay degradation estimation step estimates said delay degradation degree of at least one of the said plurality of circuit cells which compose said target LSI, by using a signal path consisting of a plurality of circuit cells as a unit;

said LSI timing degradation estimation step estimates a delay of said signal path in said target LSI which has been degraded with time, based on said estimated delay degradation degree of said signal path; and said simulation step simulates the operation of said target LSI after degradation, based on said estimated delay of said signal path in said degraded target LSI.

* * * * *